June 1, 1965   D. K. LYLES   3,186,612
AUTOMOBILE REAR TIRE ATTACHMENT
Filed Nov. 20, 1962
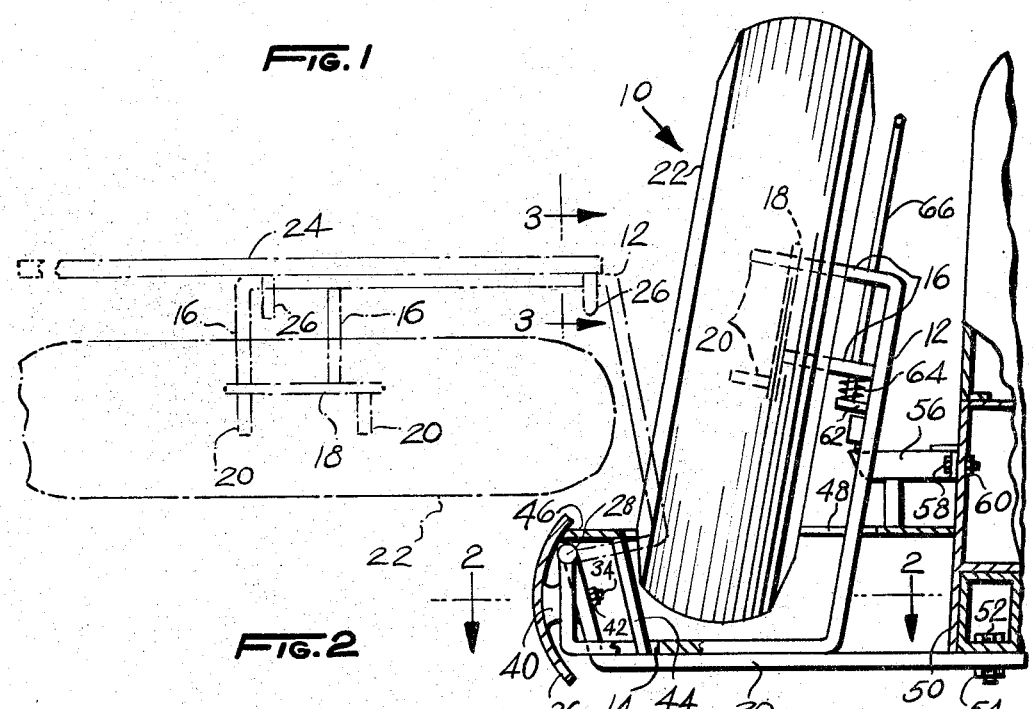
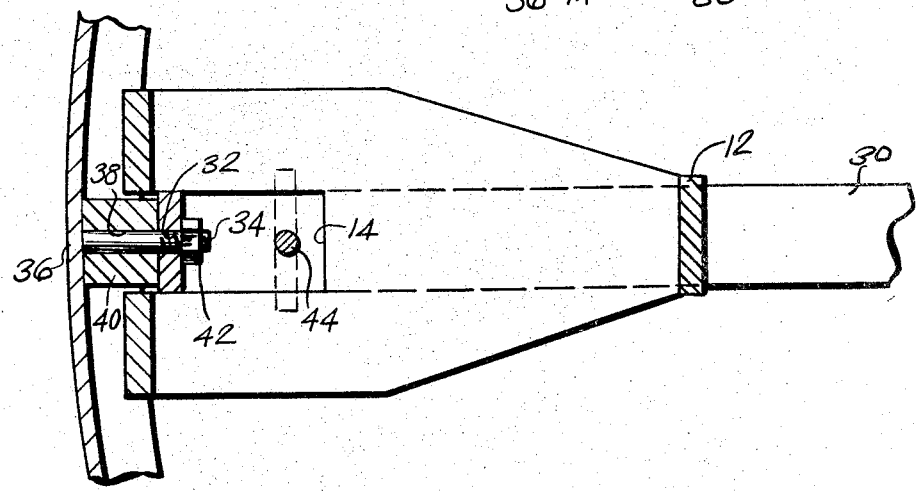
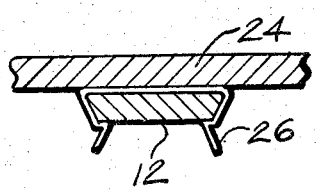
INVENTOR.
Douglas K. Lyles 3,186,612
AUTOMOBILE REAR TIRE ATTACHMENT
Douglas Kermett Lyles, 10652 SE. Clinton,
Portland, Oreg.
Filed Nov. 20, 1962, Ser. No. 238,990
7 Claims. (Cl. 224—42.01)

This invention relates to automobile spare tires and more particularly to a continental tire kit.

It is an object of the present invention to provide a spare tire attachment that will fasten to a frame member of the automobile and extend rearwardly thereof.

Another object of the present invention is to provide a spare tire attachment which will have the spare tire mounted on the device with the device folding up or down and firmly locking in either position, and when open provides a support for a circular table retained by spring clips. The table will thus provide a means for individuals to eat off of or may be used used for any other desired purpose.

Other objects of the invention are to provide a spare tire attachment bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a side view of the rear of an automobile showing the present attachment installed on the automobile, a portion of the structure being broken away for clarity;

FIGURE 2 is a sectional view taken on the lines 2—2 of FIGURE 1; and

FIGURE 3 is a sectional view taken on the lines 3—3 of a broken line portion of FIGURE 1.

Referring now more in detail to the drawing, a spare tire attachment 10 made in accordance with the present invention is shown to include a yoke or arm 12 having a rectangularly configurated opening 14 in its upper end of the arm 12. The lower end has a pair of parallel, spaced braces 16 which are fixedly secured to a tire mounting plate 18 having threaded studs 20 which receive tire 22. A table top or plate 24 of circular configuration is provided with a pair of spring clips 26 adapted to frictionally receive yoke 12 when tire 22 is horizontal with the ground. Yoke 12 is pivotally mounted on pin 28 which projects from L-shaped configurated frame 30. An opening 32 of circular configuration through frame 30 freely receives stud 34 which is fixedly secured to bumper 36. Stud 34 is freely and slidably received within an opening 38 of a bumper mounting bracket 40. Stud 34 threadingly receives nut 42 thus securing frame 30 to bumper 36. An angular brace 44 is fixedly secured between frame 30 and panel 46. An opening 48 through panel 46 freely receives yoke 12 and tire 22, the latter extending partially downward through opening 48. Frame 30 is secured beneath the rear of automobile 50 by a threaded bolt 52 which threadingly receives nut 54. A T shaped locking bracket 56 is secured to the rear of automobile 50 by bolt 58 which threadingly receives nut 60 and a locking lug 62 is springingly urged downward by coil spring 64 thus locking tire 22 into place on automobile 50. Coil spring 64 is freely and slidably received over the lower end of a T shaped handle 66 which provides a means for locking or unlocking tire 22 into position.

In operation, handle 66 is grasped in the hands and lifted upward thus releasing locking lug 62 of locking bracket 56 after which the operator grasps the tire 22 and pivots it rearward of automobile 50 by yoke 12 pivoting on pin 28 until yoke 12 rests against the rear end of opening 48 which provides stop means for tire 22. The operator then places the circular table 24 over the yoke 12 and urges the clips 26 in clamping engagement with yoke 12 thus securing table 24 for use.

When finished with table 24 clips 26 are disengaged from yoke 12 and yoke 12 is then pivoted upon pivot pin 28 back into position whereupon frame 30 provides stop means for yoke 12. The operator then lifts handle 66 upward against the action of spring 64 until lug 62 fits into place in bracket 56 which will thus secure tire 22 into position upon automobile 50.

It shall thus be recognized that table 24, when not in use, may be stored in any desired place after removing it from yoke 12.

While various changes may be made in the detail construction it shall be understood that such changes shall be within the spirit and scope of the present invention as defined by the appended claims.

What I claim as new and desire to protect by Letters Patent of the United States is:

1. An automobile spare tire attachment comprising a frame member, means for securing said frame member on an automobile in rearwardly projecting relation, a wheel supporting arm pivotally mounted on said frame member, said wheel supporting arm including an upright portion for holding engagement with a wheel and a rearwardly extending horizontal portion integral with said upright portion, means at the rearward end of said horizontal portion pivotally connecting said wheel supporting arm to said frame member, said wheel supporting arm being normally supported on said frame member in an upright position and being pivotal rearwardly to a horizontal position to the rear of said frame member, and stop means on said frame member for holding said wheel supporting arm in its horizontal position.

2. The spare tire attachment of claim 1 including a plate, and releasable attachment means on said plate for attaching said plate to said wheel supporting arm when the latter is in its horizontal position whereby said plate forms a table top surface.

3. An automobile spare tire attachment comprising a frame member, means for securing said frame member on an automobile in rearwardly projecting relation, a wheel supporting arm pivotally mounted on said frame member, said wheel supporting arm including an upright portion and a rearwardly extending horizontal portion integral with said upright portion, means on the upright portion of said wheel supporting arm to attach a spare wheel to the rear side of said wheel supporting arm, means at the rearward end of said horizontal portion pivotally connecting said wheel supporting arm to said frame member, said wheel supporting arm being normally supported on said frame member in an upright position and being pivotal rearwardly to a horizontal position to the rear of said frame member, whereby said wheel supporting arm lies on the upper side of a wheel in said horizontal position, and stop means on said frame member for holding said wheel supporting arm in its horizontal position.

4. An automobile spare tire attachment comprising a frame member, means for securing said frame member on an automobile in rearwardly projecting relation, a wheel supporting arm pivotally mounted on said frame member, said wheel supporting arm being normally supported on said frame member in an upright position and being pivotal rearwardly to a horizontal position, stop means on said frame member for holding said wheel supporting arm in its horizontal position, a plate member, and releasable attachment means on said plate member for attaching the latter to said wheel supporting arm when the latter is in its horizontal position whereby said plate member forms a table top surface.

5. An automobile spare tire attachment comprising a frame member including a horizontal portion and an integral upwardly angled outer portion; means for securing said frame member on an automobile in rearwardly projecting relation; a wheel supporting arm including an upright portion for holding engagement with a wheel, a horizontal portion integral with said upright portion and engageable with the horizontal portion of said frame member for supporting the wheel supporting arm on the frame in its upright position, and a second upright portion integral with said horizontal portion; pivot means connecting said upright portion with the upwardly angled portion of said frame member; said wheel supporting arm being normally supported on said frame member in an upright position and being pivotal rearwardly to a horizontal position, and stop means on said frame member for holding said wheel supporting arm in its horizontal position.

6. The spare tire attachment of claim 5 wherein the horizontal portion of said wheel supporting arm is bifurcated and extends on opposite sides of the upwardly angled portion of said frame member and wherein the pivot means in interconnected between said bifurcated portions of the arm and the upwardly angled portion of said frame member.

7. The spare tire attachment of claim 5 wherein said stop means comprises a horizontal plate secured to said frame member above the latter and is engageable by the second upright portion of said wheel supporting arm.

References Cited by the Examiner

UNITED STATES PATENTS

| 1,575,114 | 3/26 | Gilmore | 292—57 |
| 1,877,887 | 9/32 | Fulton | 224—42.21 |
| 1,879,761 | 9/32 | Neiler et al. | |
| 2,052,970 | 9/36 | Erbeck | 224—42.21 |
| 2,493,624 | 1/50 | Gerson | 292—17 |
| 2,692,174 | 10/54 | Whitehead | 108—157 |

HUGO O. SCHULZ, *Primary Examiner.*